Aug. 5, 1924.

J. METTLER

PREPAYMENT METER

Filed April 10, 1922

1,503,698

Inventor
Josef Mettler
By B. Singer, Atty.

Patented Aug. 5, 1924.

1,503,698

UNITED STATES PATENT OFFICE.

JOSEF METTLER, OF ZUG, SWITZERLAND, ASSIGNOR TO THE FIRM LANDIS & GYR A.-G., OF ZUG, SWITZERLAND.

PREPAYMENT METER.

Application filed April 10, 1922. Serial No. 551,398.

*To all whom it may concern:*

Be it known that I, JOSEF METTLER, a citizen of the Swiss Confederation, residing at Zug, in the Canton of Zug, Switzerland, have invented certain new and useful Improvements in Prepayment Meters, of which the following is a full, clear, and exact description.

The invention relates to prepayment meters of the type in which two cyclometer counting trains are mounted freely on a common spindle; one of these counting trains indicating the total number of inserted coins, and the other the number of coins still unused. The invention presents the improvements of a very simple and compact design. The arrangement of the differential gear employed in a separate frame makes possible a very simple assembly. Furthermore two pairs of ratio wheels which may be chosen according to requirements are mounted outside the frame and may thus be easily exchanged without disturbing the other gears.

Figure 1:
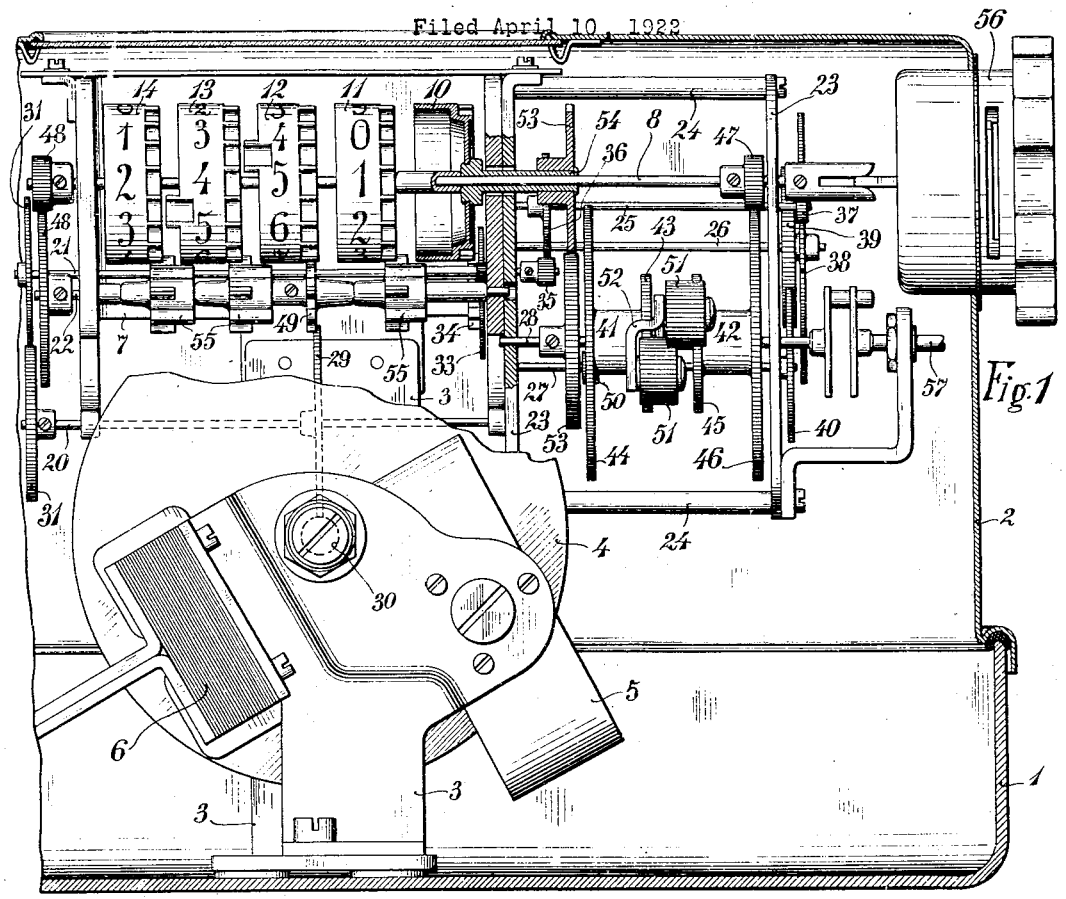
Figure 2:
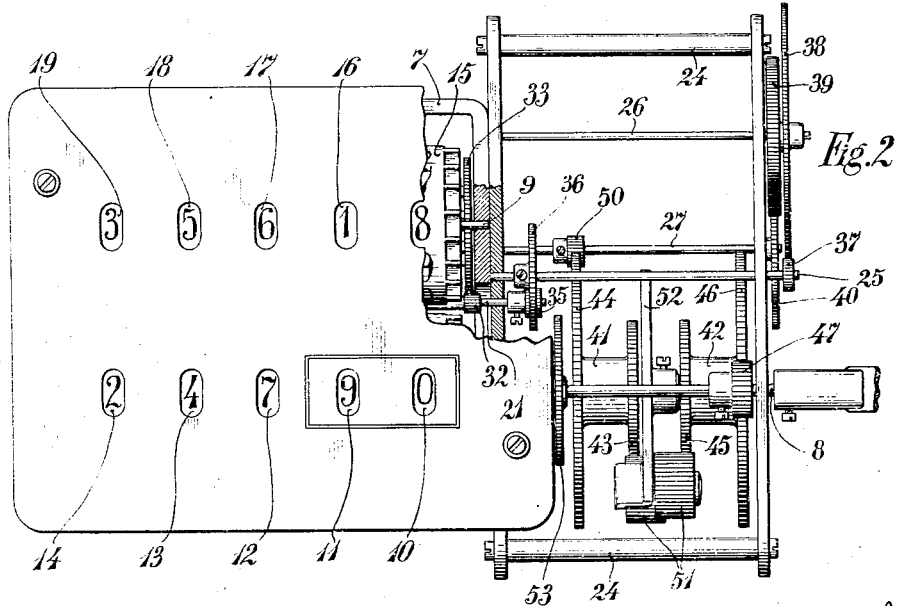

Fig. 1 shows a prepayment meter with a base-plate 1 and a cover 2. The Ferraris disc 4 and the other parts of the meter such as the brake magnet 5 and the iron core 6, are fixed to the base plate by means of supports 3. One of these supports 3 carries a frame 7 in which figure wheels 10, 11, 12, 13, 14, 15, 16, 17, 18, 19, turn freely on the spindles 8 and 9. The figure wheels 15—19 are clearly shown in Fig. 2. The frame 7 carries, in addition, the spindles 20, 21 and 22.

On one side of the frame 7 is fixed a second frame formed by two plates 23, held together by the columns 24. Both these frames may be seen in plan in Fig. 2. The plates 23 serve as bearings for the spindles 25, 26, 27 and 28. The spindle 8 extends right through both frames and is supported in the outer plate 23. The spindle of the Ferraris disc 4 carries a worm 30 which meshes with a worm wheel 29, mounted on the spindle 20, which in turn transmits the motion to the spindle 21 by means of a gear 31. On the spindle 21, and inside the frame 7, is mounted a pinion 32, which meshes with the toothed wheel 33. Compound with the wheel 33 is a further toothed wheel 34 gearing with the digit wheel 15. Loosely running on the spindle of the wheels 33 and 34 are mounted decade wheels which effect, in the usual way, the decade control of the figure wheels 15, 16, 17, 18, 19. On the end of the spindle 21, and projecting into the space between the plates 23, is rigidly mounted a pinion 35 which meshes with the toothed wheel 36 mounted on the spindle 25. At the opposite extremity of the spindle 25 is a pinion 37 which meshes with one (38) of the compound wheels 38, 39, these latter being rigidly mounted on the spindle 26. The toothed wheel 39 is in gear with a wheel 40 mounted on the spindle 27. The wheels 37, 38, 39 and 40 are variable and may be chosen according to requirements. Mounted loosely on the spindle 28 are two hubs 41 and 42, these carrying the gear wheels 43 and 44, and 45 and 46 respectively. The toothed wheel 46 drives the figure roll 12 through the intermediary of the pinions 47 and 48 on the spindle 8, and the toothed wheel 49, this latter being rigidly mounted on the spindle 22. The toothed wheel 44 is in gear with a wheel 50 fixed rigidly to the spindle 27.

The toothed wheels 43, 45, together with two planet wheels 51, form a differential gear in which the planet wheels 51 gear on the one hand with one another, and on the other hand with the toothed wheels 43 and 45 respectively. The planet wheels 51 are carried by the arm 52 which is itself fixed to the spindle 28. This spindle 28 transmits the motion through the gears 53 to the hub 54 which rides loosely on the spindle 8 and to whose extremity is attached the figure wheel 10. On the spindle 22 are loosely mounted decade wheels 55 which effect the decade control between the figure wheels 10 and 11, and 12—14, in the usual way.

The spindle 8 is coupled to the coin receiving device 56 of the prepayment meter. The spindle 28 is in communication with a spindle 57, this latter controlling means for the switching off of the electrical supply.

Upon the insertion of coins in the coin receiving device 56 the spindle 8 is rotated and simultaneously the figure wheel 12 of the counting train 12, 13, 14, is turned through the intermediary of the gear 48, the spindle 22 and the toothed wheel 49. At the same time the figure range 10 of counting train 10, 11 is turned by means of the toothed wheel 46, the differential gear 45, 51 and 43 which rotates about the toothed wheel 43, and the gear 53. The inserted coins are thus registered on both counting trains. By the action of inserting coins the measuring element, i. e. the meter of the prepayment meter is switched in and the counting train formed by the figure wheels 15—19 begins to register the electrical energy sold.

Now the Ferraris disc 4 drives the figure wheel 10 of the counting train 10, 11 in the opposite sense of rotation through the intermediary of the gear 31, the spindle 21, the wheels 35 and 36, the spindle 25, the gears 37, 38, 39 and 40, the spindle 27 and the pinion 50, the toothed wheel 44, and, finally, the planet wheels 51 of the differential gear. Consequently in this train the number of coins for which current has already been consumed is subtracted and the counting train shows, therefore, the number of coins unused. During this time the spindle 8 does not turn. If other coins are inserted the cycle described is repeated and the counting train 12, 13, 14 registers the freshly inserted coins, adding them to those already inserted. At the same time the freshly inserted coins are likewise registered on the counting train 10, 11.

What I claim is:—

1. In a device on prepayment meters for gas, water, electricity, or similar commodity with two cyclometer counting trains turning freely on a common spindle, of which counting trains one indicates the total number of coins inserted and the other indicates the number of coins still unused, a spindle carrying loosely mounted decade wheels, this spindle controlling the first counting train (actuated by the coin-receiving device) of the prepayment meter, and a spindle carrying a differential gear controlling the second counting train.

2. In a device on prepayment meters for gas, water, electricity or similar commodity, two cyclometer counting trains turning freely on a common spindle, of which counting trains the first indicates the total number of coins inserted and the second the number of coins still unused, there being a third counting train indicating the total energy consumed mounted on a second spindle, whereby the said two spindles, together with the spindles on which are mounted the decade wheels for all three counting trains, are arranged in one frame, there being a second frame supporting the differential gear for controlling the second counting train.

3. In a device on prepayment meters for gas, water, electricity or similar commodity three cyclometer counting trains, arranged in a frame so as to turn free on two spindles, and actuated by decade control wheels which ride loosely on other spindles mounted in the frame, there being a differential gear, between the plates of a second frame, which serves to transmit the motion to one of the counting trains, and in addition gears serving to transmit the motion of the measuring element of the prepayment meter to the differential gear, whereby these latter gears are mounted outside the plates on the extremities of the spindles extending through the plates.

4. In a device on prepayment meters for gas, water, electricity or similar commodity, two cyclometer counting trains mounted on a common spindle, of which counting trains the first indicates the total number of inserted coins and the second the number of coins still unused, there being a differential gear whereby the units figure roll of the second counting train is mounted on a hub which is free to turn on its spindle and which carries a toothed wheel in mesh with another toothed wheel fixed rigidly on the spindle of the differential gear, together with the arm carrying the planet wheels of the latter.

5. In a device on prepayment meters for gas, water, electricity, or similar commodity, two cyclometer counting trains mounted on a common spindle, the first counting train indicating the total number of coins inserted and the second the number of coins still unused, whereby the spindle is coupled to the coin receiving device through a gear train with a spindle on which the decade wheels for both counting trains ride freely, and on which is rigidly mounted a toothed wheel driving the units figure roll of the first counting train.

6. In a device on prepayment electricity meters three cyclometer counting trains two of which are arranged on a common spindle, and the third on a second spindle, two spindles carrying loosely mounted decade wheels and a differential gear, whereby the separately mounted counting train is driven by a spindle which is in gear, on the one hand, through a train of wheels with the moving part of the measuring element of the prepayment meter, and on the other hand is connected through a second wheel train to the differential gear, and whereby one spindle of this differential gear is in connection with the units figure roll of one of the two counting trains mounted together on the common spindle.

7. In a device on prepayment electricity meters three cyclometer counting trains of which two turn freely on a common spindle and the third is mounted separately on a second spindle, a spindle on which are loosely mounted decade wheels for the decade control of both counting trains on the common spindle, a toothed wheel being rigidly fixed to this decade wheel spindle and gearing with the unit figure roll of one of the counting trains, whereby this decade wheel spindle gears through a wheel train with the spindle bearing the two counting trains, this latter spindle being in turn coupled to the coin receiving device of the prepayment meter.

In witness whereof I affix my signature.

JOSEF METTLER.